US012809631B2

(12) United States Patent
Widigen

(10) Patent No.: US 12,809,631 B2
(45) Date of Patent: Nov. 24, 2026

(54) COMPACT REGISTER SPECIFIERS FOR COMPACT INSTRUCTION ENCODING AND CONDITIONAL PORT USAGE

(71) Applicant: TUPLE SEMICONDUCTOR, INC., Tempe, AZ (US)

(72) Inventor: Larry Frank Widigen, Tempe, AZ (US)

(73) Assignee: TUPLE SEMICONDUCTOR, INC., Tempe, AZ (US)

( * ) Notice: Subject to any disclaimer, the term of this patent is extended or adjusted under 35 U.S.C. 154(b) by 0 days.

(21) Appl. No.: 19/352,431

(22) Filed: Oct. 7, 2025

(65) Prior Publication Data

US 2026/0133801 A1 May 14, 2026

Related U.S. Application Data

(60) Provisional application No. 63/719,423, filed on Nov. 12, 2024.

(51) Int. Cl.
*G06F 9/30* (2018.01)
*G06F 9/34* (2018.01)

(52) U.S. Cl.
CPC ........ *G06F 9/30156* (2013.01); *G06F 9/3016* (2013.01); *G06F 9/34* (2013.01)

(58) Field of Classification Search
CPC ............... G06F 9/30156; G06F 9/3016; G06F 9/30178; G06F 9/34
See application file for complete search history.

(56) References Cited

U.S. PATENT DOCUMENTS 6,157,996 A * 12/2000 Christie .............. G06F 9/30138 712/E9.05
2003/0200420 A1* 10/2003 Pechanek .............. G06F 9/3885 712/E9.071
(Continued)

OTHER PUBLICATIONS

Author Unknown, "Chapter 5, The LC-3", Mcgraw-Hill, Lewis/Martin (2004/2005), retrieved on Mar. 18, 2024 from https://acg.cis.upenn.edu/milom/cse240-Fall05/handouts/Ch05.pdf, in 13 pages.
(Continued)

*Primary Examiner* — David J. Huisman
(74) *Attorney, Agent, or Firm* — HAYNES BEFFEL & WOLFELD LLP; Ernest J. Beffel, Jr.; Korbin S Van Dyke

(57) ABSTRACT

A processor is enabled to execute instructions encoded according to compact register specifiers. A compact register specifier includes a register identification field, and a register offset field. The register identification field and the register offset field collectively specify two of the registers of the logical register address space using fewer resources of an instruction encoding (e.g., fewer bits) than two full length logical register specifiers. The register identification field is a full-length register specifier that enables, without any additional information, addressing any register of a logical register address space. The register offset is usable with additional information to address any register of the logical register address space. The additional information includes the register identification field and a function, such as an arithmetic function (e.g., addition) or a logical function (e.g., exclusive-OR).

2 Claims, 2 Drawing Sheets

(56) References Cited

U.S. PATENT DOCUMENTS

| | | | | |
|---|---|---|---|---|
| 2011/0047355 | A1* | 2/2011 | Mejdrich | G06F 9/342<br>712/225 |
| 2012/0084535 | A1* | 4/2012 | Hickey | G06F 9/3016<br>712/E9.016 |
| 2024/0070011 | A1* | 2/2024 | Baronne | G06F 9/3867 |

OTHER PUBLICATIONS

Grady, "TMS320C54x DSP Programming Environment, Application Brief: SPRA182", Texas Instruments (1997) in 19 pages.

Simon Fraser Univerity, School of Computing Science, "Lecture 24. July 7", retrieved on Mar. 18, 2024 from https://www2.cs.sfu.ca/CourseCentral/250/ggbaker/notes/250notes-24.pdf, in 2 pages.

Wikipedia,"Addressing Mode", retrieved on Mar. 18, 2024 from https://en.wikipedia.org/wiki/Addressing_mode, in 13 pages.

* cited by examiner

COMPACT REGISTER SPECIFIERS FOR COMPACT INSTRUCTION ENCODING AND CONDITIONAL PORT USAGE

RELATED APPLICATIONS

This application claims priority under 35 U.S.C. § 119 (e) to U.S. Provisional Patent Application No. 63/719,423, entitled "COMPACT REGISTER SPECIFIERS FOR COMPACT INSTRUCTION ENCODING" filed on Nov. 12, 2024, which application is incorporated herein by reference.

BACKGROUND

Field

This disclosure relates to instruction encoding for processors.

Description of Related Art

Processors, such as those used in computers, execute instructions according to one or more instruction set architectures. Each instruction set architecture includes one or more instructions according to one or more instruction encodings. One or more of the instruction encodings include at least one opcode field and one or more register specifier fields that specify registers accessed (e.g., read and/or written) in accordance with the at least one opcode field. Instructions that include more opcodes and/or more associated register specifier fields are larger than instructions that do not. Thus, either some instructions are larger than others, resulting in variable length instructions and complexities associated therewith, or alternatively instructions have a fixed length determined by instructions that include more opcodes and/or more associated register specifier fields, resulting in increased instruction size.

New techniques for register specifiers are needed to address the foregoing.

SUMMARY

The new techniques for register specifiers, such as compact register specifiers for compact instruction encoding as disclosed herein, address the foregoing as described following.

DETAILED DESCRIPTION

Figure 1:
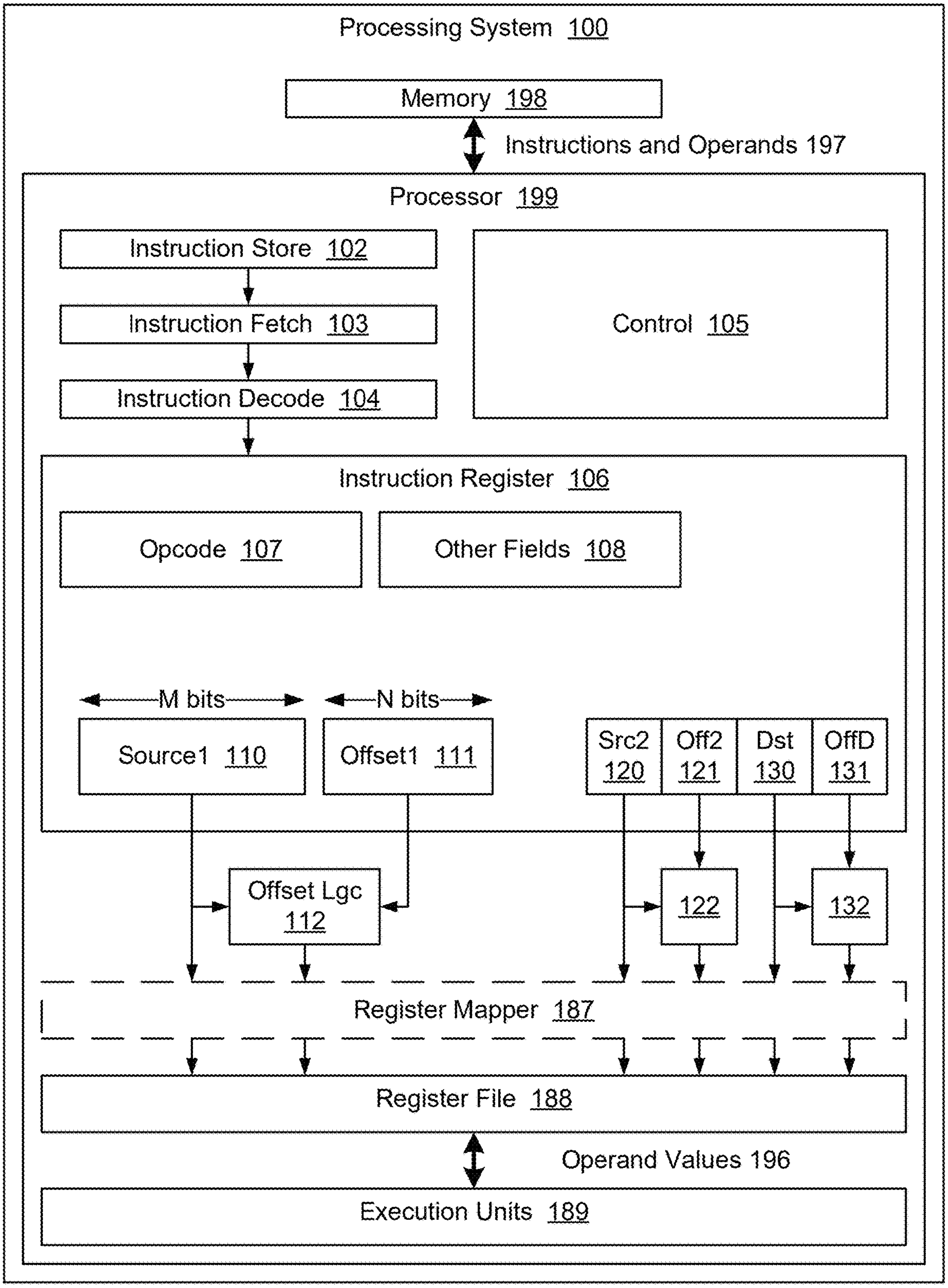
FIG. 1 illustrates an example of a processing system using compact register specifiers for compact instruction encoding.
Figure 2:
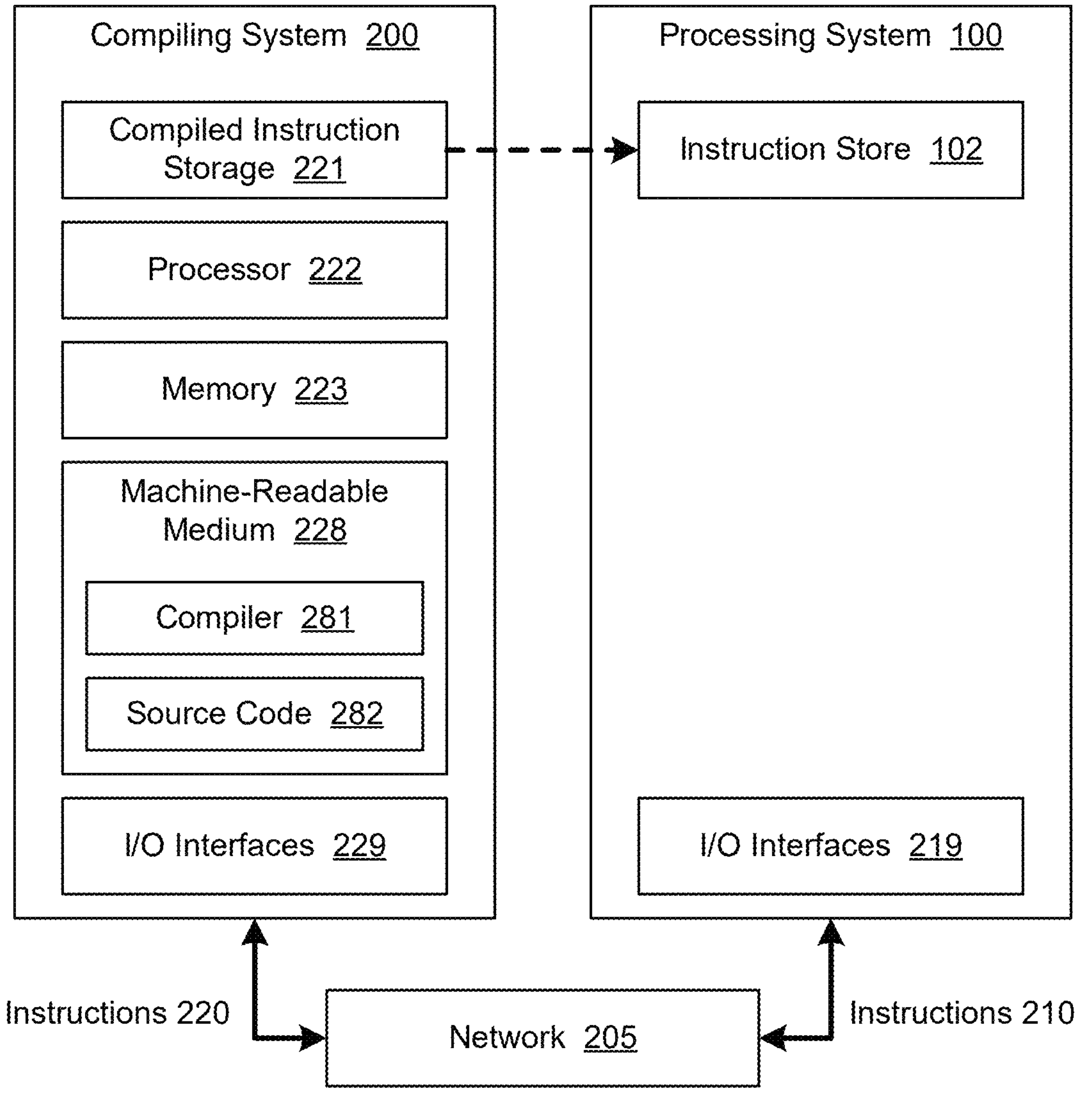
FIG. 2 illustrates an example compiling system using compact register specifiers for compact instruction encoding in a usage context including a processing system using compact register specifiers for compact instruction encoding.

A detailed description of techniques relating to compact register specifiers for compact instruction encoding follows, with references to FIGS. 1-2.

Throughout the description herein, as well as the associated figures, like-numbered elements correspond to identical elements, substantially similar elements, and/or instances thereof.

A processor is enabled to execute compact instructions encoded according to compact register specifiers. A compact register specifier includes a register identification field and a register offset field. The register identification field and the register offset field collectively specify two of the registers of the logical register address space using fewer resources of an instruction encoding (e.g., fewer bits) than two full length logical register specifiers. The register identification field is a full-length register specifier that enables, without any additional information, to address any register of a logical register address space. The register offset field is usable with additional information to address any register of the logical register address space. The additional information includes the register identification field and a function, such as an arithmetic function (e.g., addition) or a logical function (e.g., exclusive-OR). The function optionally includes extension of the most significant bit of the register offset field to a bit width matching that of the full-length register specifier. The extension, according to implementation, is optionally and/or selectively according to a zero-extension, a one-extension, or a sign-extension.

As a specific example, each instruction is a fixed-length instruction of 32 bits, and there are 32 logical registers. Each logical register is 64 bits or any suitable number of bits. Data types include logical, integer, and floating-point. Optionally, the processor is enabled for any one or more of speculative execution, out-of-order execution, and superscalar execution. Instructions are optionally issued when all source operands are available (e.g., ready and/or read from a physical register). Optionally the logical registers of the logical register address space are implemented via a plurality of physical registers that are dynamically mapped to the logical registers, e.g., via register renaming.

Continuing with the specific example, as there are 32 logical registers, a full-length register specifier is five bits. Thus, the register identification field is five bits. A compact register specifier is fewer bits than two full-length register specifiers, so for the specific example, the register offset field is no more than four bits.

In a first implementation of the specific example, the register offset field is one bit, and the function is an arithmetic function (addition) with a sign extension of the register offset field. Thus, responsive to an instruction having the register identification field having a (5-bit) value of zero and the register offset field having a (2-bit) value of 1, logical register 0 (as addressed by the register identification field) and logical register 1 (as addressed by the register identification field value added to the register offset field value) are addressed.

In a second implementation of the specific example, the register offset field is four bits, and the function is a logical function (exclusive-OR). Thus, responsive to an instruction having the register identification field having a (5-bit) value of all ones and the register offset field having a (4-bit) value of all ones, logical register 31 (as addressed by the register identification field) and logical register 16 (as addressed by the register identification field value exclusive-ORed with the register offset field value) are addressed.

Processing System

FIG. 1 illustrates an example of a processing system using compact register specifiers for compact instruction encoding.

Processing System 100 includes Memory 198 coupled to Processor 199. Processor 199 includes Instruction Store 102, Instruction Fetch 103, Instruction Decode 104, and Control 105. Processor 199 further includes Instruction Register 106, and Offset Logic elements (Offset Lgc) 112, 122, and 132.

Processor 199 further includes Register Mapper 187, Register File 188, and Execution Units 189. Instruction Register 106 includes Opcode 107, Source1 110, Offset1 111, Source2 (Src2) 120, Offset2 (Off2) 121, Destination (Dst) 130, OffsetDestination (OffD) 131, and Other Fields 108. Source1 110 is an example of a register identification field, as referred to elsewhere herein. Offset1 111 is an example of a register offset field, as referred to elsewhere herein. Information collectively stored in Source1 110 and Offset1 111 is an example of a compact register specifier (as is information stored collectively in Source2 120 and Offset2 121, and so forth).

Processor 199 accesses operands (e.g., via read and write operations) from Memory 198. Memory 198 provides storage for Instructions and Operands 197 for access by Processor 199. Instructions (e.g., from Memory 198) are stored in Instruction Store 102 and read therefrom by Instruction Fetch 103. Instruction Store 102 provides temporary storage for instructions and includes, for example, an instruction cache. Instruction Fetch 103 provides instructions from Instruction Store 102 to Instruction Decode 104. Instructions are parsed into one or more fields and the fields are interpreted according to instruction decoding rules by Instruction Decode 104.

In operation, Processing System 100 operates to execute stored instructions. The instructions are stored, for example, in a tangible computer readable media, e.g., as implemented by any combination of Memory 198 and Instruction Store 102. The instructions are executed by fetching, decoding, and performing operations as specified by the instructions. At least some of the operations include accessing operands. The operands are accessed in various elements of the figure, such as Memory 198 and/or Register File 188, depending on instruction specifics. Operands accessed in Memory 198 are addressed via a memory address space. For example, the memory address space corresponds to 264 single-byte locations, e.g., a 64-bit address space. An example instruction that accesses an operand in the memory address space is a memory load instruction. The memory load instruction specifies an address from which a memory location, e.g., as implemented by Memory 198, is read. Operands accessed in Register File 188 are addressed via a register address space. For example, the register address space corresponds to 64 registers, each of 64 bits, and each register has a 6-bit address (the registers correspond to register[0] . . . register [63**]). An example instruction that accesses an operand in the register address space is a register-to-register arithmetic instruction.

A first example register-to-register arithmetic instruction includes a first source register specifier (e.g., as stored in Source1 110) that specifies a first source register address from which a first source register (e.g., as implemented by Register File 188) is read. The first example register-to-register arithmetic instruction further includes a second source register specifier (e.g., as stored in Source2 120) that specifies a second source register address from which a second source register is read. The first example register-to-register arithmetic instruction further includes a destination register specifier (e.g., as stored in Destination 130) that specifies a destination register address to which a result of the first example register-to-register instruction is written. As a specific example, the first and second source registers, as well as the destination register, are implemented by Register File 188, as illustrated conceptually by Operand Values 196.

A second example register-to-register instruction is similar to the first example register-to-register instruction, except that compact register specifiers for compact instruction encoding are used for any one or more of a first source compact register specifier, a second source compact register specifier, and a destination compact register specifier, enabling any one or more of the first source compact register specifier, the second compact source register specifier, and the destination compact register specifier to each specify two registers.

More specifically, Source1 110 and Offset1 111 are collectively usable to identify two source registers, as follows. Source1 110 is M bits and is sufficient to uniquely identify any one of the registers in the register address space without any additional information. For example, if there are 64 registers, then M is 6, e.g., 6 bits are sufficient to uniquely identify any one of the 64 registers. Offset1 111 is N bits and is combined with other information to uniquely identify any one of the registers in the register address space. Continuing with the example, N is 4, e.g., 4 bits, and Offset1 111 is combined with other information to uniquely identify any one of the registers in the register address space. An example of the combining is performed by Offset Logic 112. Offset Logic 112 performs a function in dependence on Source1 110 and Offset1 111 to provide an output that is sufficient to uniquely identify any one of the 64 registers. Example functions include an arithmetic function (e.g., an arithmetic sum, such as a two's complement addition) and a logical function (e.g., an exclusive- or function).

As a specific example, Source1 110 has the value 0b11_1000 to address register 56 without further information. Offset1 111 has the value 0b0100. Offset Logic 112 performs the arithmetic function of addition. Thus, the value in Source1 110 is combined (via addition) by Offset Logic 112 with the value from Offset1 111 to address register 60. Therefore, instead of using 12 bits to address two unique registers of 64 registers (6 bits for each register), 10 bits are used (6 bits for a first register and 4 additional bits for the second register).

Source 2 120 and Offset2 121 are analogous respectively to Source1 110 and Offset1 111, and are collectively usable to identify two register sources using a function performed by Offset Logic 122.

Destination 130 and OffsetDestination 131 are similar respectively to Source1 110 and Offset1 111, but are collectively usable to identify two register destinations using a function performed by Offset Logic 132.

Other examples are contemplated with any number of sources and any number of destinations, identifiable using compact register specifiers for compact instruction encoding. A first example instruction has four Source fields (Source1, Source2, Source3, and Source4) and four Offset fields (Offset1, Offset2, Offset3, and Offset4). Each Source/Offset pair enables identifying two source registers, for a total of eight source registers. The first example instruction further has two Destination fields (Destination1 and Destination 2) and two Offset Destination fields (OffsetDestination1 and OffsetDestination2). Each Destination/OffsetDestination pair enables identifying two destination registers, for a total of four destination registers. In some cases of the first example instruction, there are a plurality of opcodes, each referencing one or more of the source and/or destination registers. A second example instruction has a single Source field, a single Offset field and a single Destination field, enabling identifying two source registers and one destination register.

In some examples, use of compact register specifiers for compact instruction encoding is determined on an instruction-by-instruction basis. For example, decoding of instructions according to compact register specifiers for compact instruction encoding is dependent on one or more opcodes of an instruction, and/or one or operating modes of Processor 199. In some examples, the function used to determine a second register address is dependent on one or more opcodes of an instruction, and/or one or more operating modes of Processor 199.

In some examples, responsive to any one or more offset fields (e.g., as provided by any one or more of Offset1 111, Offset2 121, and/or OffsetDestination 131) being zero, a single register is referenced (either as a source or as a destination), based on a register specifier field (e.g., as provided by any one or more of Source1 110, Source2 120, and/or Destination 130). In some examples, for an instruction using two destinations, there is no destination offset field. Instead, a second destination register address is determined as an increment by one of the (first) destination register address (e.g., as provided by a register specifier). In some examples, for an instruction otherwise using two destinations, responsive to the destination offset field being zero, a single destination register (as specified by the destination register specifier field) is used, rather than two destination registers.

Control 105 coordinates operations of the various elements of Processor 199. Control 105 is variously implemented via hard-wired logic gates, microcode, state machines, and/or any technique suitable to perform the coordination of the operations.

Examples of tangible computer readable media include non-volatile media, such as magnetic media, optical media, and solid-state media.

Compiling System

FIG. 2 illustrates an example compiling system using compact register specifiers for compact instruction encoding in a usage context including a processing system using compact register specifiers for compact instruction encoding.

Compiling System 200 includes Compiled Instruction Storage 221, Processor 222, Memory 223, Machine-Readable Medium 228, and I/O Interfaces 229. Machine-Readable Medium 228 provides for storage of Compiler 281 and Source Code 282. Processing System 100 includes Instruction Store 102, as illustrated in FIG. 1, and further includes I/O Interfaces 219. Network 205 couples Compiling System 200 and Processing System 100, e.g., via I/O Interfaces 229 and I/O Interfaces 219, respectively.

In operation, Processor 222, in conjunction with Memory 223, executes instructions, such as those of Compiler 281, to compile Source Code 282 into object code instructions suitable for execution by Processing System 100, as conceptually indicated by the dashed arrow from Compiled Instruction Storage 221 to Instruction Store 102. Compiled instructions are stored, e.g., in Compiled Instruction Storage 221. In some examples, all or any portions of the compiled instructions are stored in Machine-Readable Medium 228. Compiled instructions are communicated from Compiling System 200 to Processing System 100 by Network 205, as conceptually indicated by Instructions 220 and Instructions 210. Processing System 100 receives Instructions 210 and stores the instructions, for example, in Memory 198 and/or Instruction Store 102. From Instruction Store 102, Instruction Fetch 103 fetches the instructions, and so forth, as described with respect to FIG. 1.

Processing of Source Code 282 via execution of Compiler 281 by Processor 222 enables determining values for instructions, such as values in accordance with elements of Instruction Register 106 of Processor 199 of FIG. 1. Thus, instructions are generated with register specifiers (e.g., Source1 110 having M bits) and offsets (such as Offset1 111 having N bits, N being less than M) that enable using register specifiers for compact instruction encoding.

Other Information

While the present invention is disclosed by reference to various embodiments and examples disclosed above, it is to be understood that these are intended in an illustrative rather than in a limiting sense. It is contemplated that modifications and combinations are readily apparent, and that such modifications and combinations will be within the spirit of the invention and the scope of the following claims.

What is claimed is:

1. A system, comprising:

an instruction register having one or more register address computation fields, each register address computation field comprising a register address sub-field and a register address offset sub-field;

one or more register address compute circuits, each register address compute circuit enabled to receive a respective one of the one or more register address computation fields and to use as inputs the register address sub-field and the register address offset sub-field of the respective one of the one or more register address computation fields; and a register file having one or more access ports addressable by each of the one or more register address compute circuits, and wherein using at least one of the one or more access ports is conditional upon a particular one of the one or more register address offset sub-fields being a non-zero value, the particular one of the one or more register address offset sub-fields being the register address offset sub-field received by the register address compute circuit that the at least one of the one or more access ports is addressable by.

2. The system of claim 1, wherein at least one of the one or more register address compute circuits comprises at least one of an arithmetic compute circuit and a logical compute circuit.

* * * * *